United States Patent [19]

Jones

[11] Patent Number: 5,749,618
[45] Date of Patent: May 12, 1998

[54] VISOR WITH TELESCOPING EXTENDER BLADE

[75] Inventor: James Gavin Jones, Dryden, Mich.

[73] Assignee: Irvin Automotive Products, Inc., Auburn Hills, Mich.

[21] Appl. No.: 651,044

[22] Filed: May 17, 1996

[51] Int. Cl.⁶ ............................................. B60J 3/00
[52] U.S. Cl. .................................................. 296/978
[58] Field of Search ........................ 296/97.5, 97.8, 296/97.6

[56] References Cited

U.S. PATENT DOCUMENTS

| | | |
|---|---|---|
| 2,210,892 | 6/1940 | Francis . |
| 3,649,068 | 3/1972 | Moynihan . |
| 4,169,552 | 10/1979 | Lichtenstein et al. . |
| 4,248,474 | 2/1981 | Mandrick . |
| 4,323,275 | 4/1982 | Lutz . |
| 4,353,593 | 10/1982 | Henson . |
| 4,362,330 | 12/1982 | Cramer . |
| 4,582,356 | 4/1986 | Kaiser et al. . |
| 4,783,111 | 11/1988 | Hemmeke et al. . |
| 4,926,295 | 5/1990 | Tamuray . |
| 4,929,014 | 5/1990 | Clark et al. ................. 296/97.8 |
| 4,952,008 | 8/1990 | Lobanoff et al. ............ 296/97.8 |
| 5,005,895 | 4/1991 | Muyres et al. . |
| 5,061,003 | 10/1991 | Gabas . |
| 5,156,434 | 10/1992 | Vandagriff . |
| 5,259,657 | 11/1993 | Arendt et al. . |
| 5,316,361 | 5/1994 | Miller . |
| 5,380,057 | 1/1995 | Wevers . |

FOREIGN PATENT DOCUMENTS 1402144   5/1965   France .

*Primary Examiner*—Gary C. Hoge
*Attorney, Agent, or Firm*—Harness, Dickey & Pierce, PLC

[57] ABSTRACT

A sun visor assembly having a body to which first and second panels are mounted for movement between stored and use positions. In their stored position, the panels are generally coincident with the visor body. While in their use positions, the panels extend from one end of the visor body. The side edges of the one panel are returnly bent to define a channel in which a second panel is received, telescopicly with respect to the first panel. In one position, the second panel generally coincides with the first panel and in another position the second panel forms an extension beyond the end of the first panel.

20 Claims, 1 Drawing Sheet

VISOR WITH TELESCOPING EXTENDER BLADE

BACKGROUND OF THE INVENTION

1. Field of the Invention

This invention relates to sun visor assemblies which are used in motor vehicles. More particularly, the present invention relates to sun visor assemblies having an extendible panel mounted to the main body of the visor.

2. Description of the Prior Art

Sun visor assemblies of numerous designs are well known in the art. Typically, the sun visor assembly (hereinafter visor) is mounted to a pivot arm which is in turn attached to the interior roof of the motor vehicle in the A-pillar area. The visor is capable of being rotated about the pivot arm between a "stored position" adjacent to the roof of the vehicle and a "use position" where the visor extends downward. In this downward position the visor visually blocks or screens a portion of the vehicle's windshield. The pivot arm itself is often pivotable to move the visor from a position adjacent the front windshield to one adjacent the side window, where the visor can be used to screen light coming in that window.

In many vehicles, the width of the side window or the half width of the front windshield is too great for complete screening by the visor. In an attempt to screen the remaining width of the window, extender blades have been incorporated into visors. An extender blade is an auxiliary visor blade which can be slid out of one end or the bottom edge of the visor to increase the effective length of the visor. Even with the extra length provided by the extender blade, it is often not enough to completely screen the window or windshield as desired.

That situation also arises when a vanity mirror is incorporated into the visor because the vanity occupies part of the visor body which could have otherwise been occupied by the extender blade. In this manner the vanity limits the permissible length of the extender blade.

In view of the foregoing limitations and shortcomings, as well as other disadvantages not specifically mentioned above, there still exists a need in the art for an improved visor having an extender blade.

It is therefore a primary object of this invention to fulfill that need by providing an improved visor with an extender blade having an additional extended length but without requiring a greater storage length within the visor body. One feature of the present invention is that the blade includes a primary and secondary blade, with the secondary blade telescoping over the primary blade.

It is also an object of this invention to provide an extender blade which does not significantly increase the thickness of the visor body and can be produced and assembled in a cost effective manner.

A further object of this invention is to provide an extender blade that can be incorporated into a visor having a vanity assembly without compromising the effective length of the extender blade.

SUMMARY OF THE INVENTION

Briefly described, these and other objects are accomplished according to the present invention by providing a visor having an extender blade assembly with first and second blades or panels that are telescopingly mounted to one another. Generally, the visor is adapted to be used with either the vehicle's front windshield or a side window and includes a body having portions that define a pair of opposing side and ends. Moveably mounted to the body of the visor are the pair of panels. The panels are movable between a retracted position, where they are located substantially within the perimeter of the visor body, and an extended position, where they extend beyond one end of the visor body to increase the effective length of the visor body. Additionally, the panels are moveable relative to one another. This latter movement is in a telescopic fashion and allows one of the panels to extend beyond the other to further increase the effective length of the visor without increasing their length in the stored condition.

The first or primary panel has a pair of opposing longitudinal sides, each of which terminates in a returnly bent portion. The returnly bent portions form channels which extend at least partially over of the length of this panel. The channels themselves are open in a direction toward one another and the side edges of the second panel are received in the channels of the first panel. The mounting of the second panel to the first permits the second panel to slide within the channels, longitudinally with respect to the first panel, between a retracted position where it generally coincides with the first panel and an extended position where the second panel extends beyond the distal end of the extended first panel. Accordingly, the second panel telescopes with respect to the first panel.

The panels are also shaped such that they allow a vanity to be incorporated into the visor without significantly decreasing the extendable length of the panels or increasing the thickness of the visor. This is achieved by providing a recess or cut out area in one end of the primary visor. With the cut out area, the primary visor and the vanity do not substantially overlap one another when the primary visor is in the stored position.

Additional benefits and advantages of the present invention will become apparent to those skilled in the art to which the present invention relates from the subsequent description of the preferred embodiment and the appended claims, taken in conjunction with the accompanying drawings.

DETAILED DESCRIPTION OF THE PREFERRED EMBODIMENT

Figure 1:
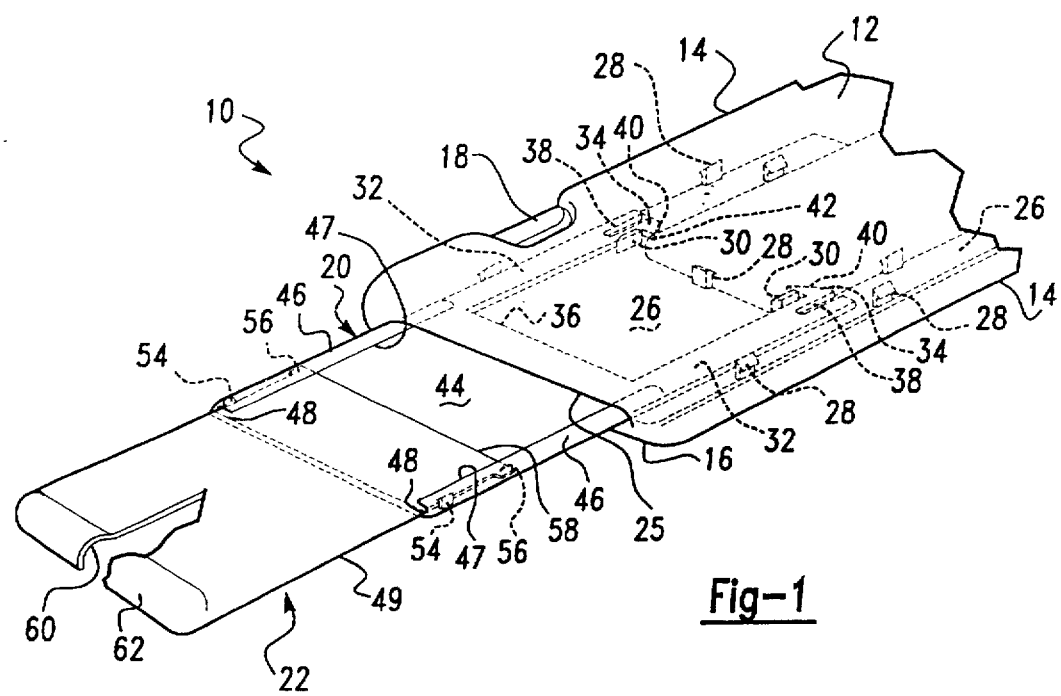
FIG. 1 is a partial perspective view of a sun visor assembly embodying the principles of the present invention and showing the telescoping extender blade assembly in a fully extended position.

Referring now in detail to the drawings, a visor assembly embodying the principles of the present invention is shown in FIG. 1 and generally designated at 10. The visor 10 includes a body 12 which is formed of rigid foam, a plastic substrate or another well known construction. The body 12 includes portions which define opposing longitudinal sides 14 and lateral ends 16 (of which only one is illustrated in the figure). Along one longitudinal side 14 of the visor body 12, the assembly 10 is provided with a support pin 18. The support pin 18 engages a support clip (not shown) and secures the assembly 10 at that end of the visor 10 to the interior roof of a motor vehicle. The visor 10 itself is carried on a pivot rod (not shown) mounted to the interior roof of the vehicle for rotation between use positions with the front windshield and side window.

In use, the visor 10 is rotatable about a major axis of the pivot rod, which extends through the support pin 18. This rotation of the visor 10 is between a stored position where the body 12 is adjacent to the roof of the vehicle and a use position where the body 12 extends downward from the roof to screen an upper portion of the vehicle's windshield. If the pivot rod and visor 10 are pivoted for use with the vehicle's side window (not shown), the visor 10 is still rotatable so that the body 12 extends downward to screen sunlight entering through the upper portion of the side window.

Often, the length of the visor 10 is insufficient to screen the entire width of the side window or a full half of the front windshield. The present invention overcomes this limitation by incorporating an extender blade assembly having a pair of extender panels, a primary panel 20 and a secondary panel 22, into the visor assembly 10. The panels 20 and 22 cooperate to effectively lengthen the visor while the second panel acts to effectively lengthen the first panel. The first and second extender blades are located within a recess 24 defined within the perimeter of the visor body 12. This recess 24 is formed in the visor body 12 so as to correspond with one end of the body 12 and form an end opening 25 of the recess 24.

A cover plate 26 is attached to the visor body 12 over the recess 24 and is used to retain the panels 20 and 22 in place. The cover plate 26 is formed with a series of locking tabs 28, which are correspondingly shaped so as to be received and retained in slots defined in the visor body 12. In attaching the cover plate 26, the plate 26 overlies the panels 20 and 22 such that the panels 20 and 22 are located in a cavity defined between the cover plate 26 and the visor body 12. In addition to the locking tabs 28, the cover plate 26 may be formed with a series of stops 30, whose purpose is more fully described below. Alteratively, some of the tabs 28 may operate as stops.

Within this cavity, panels 20 and 22 are received in a manner that allows for longitudinal movement of the panels 20 and 22 relative to the visor body 12. This movement is between a stored position and a use position. In the stored position, the panels 20 and 22 are substantially contained within the cavity that is defined between the cover plate 26 and visor body 12. In their use position, the panels 20 and 22 are at least partially extended out through opening 25 in the lateral end 16 of the visor 10.

The inboard or proximal end of the primary panel 20 is generally horseshoe shaped. More specifically, this shape is defined by a pair of legs 32 that extend longitudinally from the inboard end of the panel 20 and which terminate in a pair of inwardly turned ears 34. A closed portion 36 extends between the two legs 32 and completes the horseshoe shape. Defined immediately adjacent to each ear 34 and extending longitudinally with each legs 32 is a slot 38. By providing the slots 38 in this region, the ears 34 are allowed to outwardly deflect as a result of initial engagement with the stops 30 mentioned above. A ramped lead surface 40 is provided on the ears 34 for this purpose. Engagement of the ears 34 with the stops 30 occurs during assembly of the visor 10 with the primary panel 20 being inserted into the cavity between the cover plate 26 and visor body 12. The ramped surface 40 of the ears 34 engage the stops 30, deflect outward and snap over the stops 30 into a retained position. Removal of the primary panel 20 from the visor 10 is prevented as a result of an interference engagement between the stops 30 and a trailing shoulder 42 formed on the ears 44. The stops 30 also limit the extent to which the panels 20 and 22 can be inserted into the visor body 12. Movement is limited by the closed portion 36 engaging the stops 30 when the panel 20 is being moved into its stored position.

This horseshoe shape of the inboard end of the primary panel 20 also readily allows for a vanity 45 to be incorporated into the visor 10. By providing the open area in this end of the panel 20, the panel 20 need not extend between the vanity 45 and the visor 10 when the panels 20 and 22 are retracted. A reduced thickness in the overall visor 10 is therefore possible.

The opposing or outboard end of the primary panel 20 is a solid panel portion so that this portion can obstruct viewing therethrough when extended from the visor 10. It should be noted that the position of the closed portion 36 of the panel's proximal end, relative to the trailing shoulders 42, the length of the legs 32 and the position of the stop 30, permits only the solid panel portion of the primary panel 20 to extend from the visor body 12 when the panel 20 is in its extended position. This is generally seen in FIG. 1 where the solid panel portion is designated at 44.

The lateral sides of the primary panel 20 are formed with returnly bent portions 46 that are also readily seen in FIG. 1. While the returnly bent portions 46 are shown as extending only over a partial length of the primary panel 20, they could extend over the entire length of the primary panel 20 if desired or needed in a particular application. The returnly bent portions 46 are oriented such that they each define a channel 48 which faces the channel 48 defined by the opposing returnly bent portion 46. The returnly bent portions 46 also terminate in an edge 47 directed at the opposing edge 47 of the other returnly bent portion 46. Accordingly, the area between the two edges 47 is open. This decreases the required thickness of the visor 10, decreases the material required for construction and decreases the overall weight of the visor 10.

Figure 2:
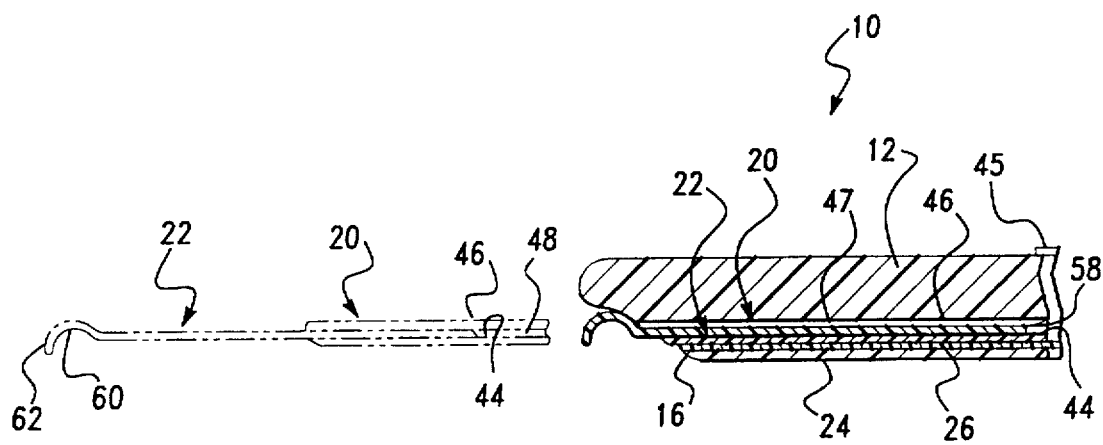
FIG. 2 is a sectional view of the sun visor illustrated in FIG. 1 showing the first and second panels in both their fully retracted position and their fully extended position (the latter being shown in phantom).

The secondary panel 22 is supported and carried by the primary panel 20. More specifically, the longitudinal sides 49 of the secondary panel 22 are received and retained within the channels 48 of the primary panel 20. This carrying of the secondary panel 22 by the primary panel 20 is such that it allows for relative movement between the secondary panel 22 and the primary panel 20 in the form of a telescoping movement. More specifically and as seen in FIG. 2, the secondary panel 22 can move from a retracted or stored position, where the secondary panel 22 substantially overlaps and coincides with the primary panel 20, to a use position where the secondary panel 22 extends longitudinally beyond the primary panel 20. The use position of the present invention is illustrated in FIG. 1 and shown in phantom in FIG. 2. The stored position of the panels 20 and 22 is seen in FIG. 2. Other positions of the panels 20 and 22 can also include: a) the primary panel 20 being extended relative the visor body 12 with the secondary panel 22 in a stored position relative the primary panel 20; and b) the primary panel 20 being stored relative to the visor body 12 and the secondary panel 22 extended relative to both the primary panel 20 and the visor body 12.

To prevent the secondary panel 22 from extending beyond and disengaging the primary panel 21, stops 54 are formed in the channels 48 adjacent to the outboard end of the primary panel 20. The stops 54 interferingly engage outwardly directed tabs 56 formed on the longitudinal sides of the secondary panel 22, located adjacent to the inboard end 58 of the secondary panel 22.

To facilitate the ease with which the panels 20 and 22 are moved relative to the visor body 12 and to also facilitate movement of the secondary panel 22 relative to the primary panel 20, the secondary panel 22 is provided with a finger grip area 60. The grip area 60 is a depression formed in the outboard end 62 of the secondary panel 22 that enables it to be more easily grasped and moved.

While the above description constitutes the preferred embodiment of the present invention, it will be appreciated that the invention is susceptible to modification, variation and change without departing from the proper scope and fair meaning of the accompanying claims.

I claim:

1. A sun visor assembly for use in a motor vehicle, said assembly comprising:

a visor body having a pair of opposing sides and a pair of opposing ends;

a first panel movably mounted to said visor body and adapted for movement between a stored position and a use position, said first panel includes a pair of longitudinally extending legs at one end thereof, said legs defining an open area therebetween, said first panel being generally coinciding with said visor body when in said stored position and generally extending beyond one edge of said visor body when in said use position, said first panel including a pair of opposing sides and each of said sides including a returnly bent portion terminating in oppositely facing edges, said returnly bent portions defining channels being open in a direction toward one another;

a second panel being movably mounted to said first panel in said channels and adapted for telescoping movement relative to said first panel between a retracted position and an extended position, said second panel generally coinciding with said first panel in said retracted position and generally extending axially beyond one end of said first panel when in said extended position; and means for retaining said first and second panels to said visor body.

2. A sun visor assembly as set forth in claim 1 wherein said legs form a portion of a said first stop means, said first stop means for preventing inadvertent disengagement of said first and second panels from said visor body.

3. A sun visor assembly as set forth in claim 1 wherein said legs terminate in laterally inwardly directed shoulders, said shoulders engaging a portion of said assembly when said first panel is in said extended position and thereby limiting movement of said first panel relative to said visor body.

4. A sun visor assembly as set forth in claim 1 further comprising first stop means for limiting movement of said first and second panels with respect to said visor body.

5. A sun visor assembly as set forth in claim 4 wherein said stop means prevents inadvertent disengagement of said first and second panels from said visor body.

6. A sun visor assembly as set forth in claim 4 wherein said stop means limits movement of said first panel into said retracted position.

7. A sun visor assembly as set forth in claim 1 further comprising second stop means for limiting relative movement of said second panel with respect to said first panel and preventing inadvertent disengagement of said second panel from said first panel.

8. A sun visor assembly as set forth in claim 7 wherein said second stop means includes a stop boss formed in said channel, said stop boss interferingly engaging a portion of said second panel to limit movement of said second panel beyond said extended position.

9. A sun visor assembly as set forth in claim 8 wherein said portion of said second panel is a laterally outwardly directed tab formed on at least one lateral side of said second panel.

10. A sun visor assembly as set forth in claim 1 wherein said first and second panels are received in a recess defined in said visor body.

11. A sun visor assembly as set forth in claim 10 wherein one end of said recess is contiguous with one end of said visor body.

12. A sun visor assembly as set forth in claim 11 wherein said first and second panels extend through said one end of said visor body which is contiguous with said recess.

13. A sun visor assembly adapted to be mounted within a motor vehicle, said sun visor assembly comprising:

a body having a pair of opposing sides and a pair of opposing ends, portions of said body defining a recess in said body and confined by said sides of said body;

a first panel movably mounted to said visor body;

a second panel movably mounted to said first panel, movement of said first and second panels relative to said body being generally parallel therewith and between a retracted position and an extended position, said panels being generally coincident with said body when in said retracted position and generally extending from one end of said body when in said extended position;

said first panel including a pair of opposing sides and ends, said sides each including a returnly bent portion forming a channel extending over at least a portion of said side of said first panel, said returnly bent portions terminating in edges generally opposing one another and defining an open region therebetween, said channels being open in a direction toward one another;

said second panel having a pair of opposing sides and ends, said sides of second panel being generally received and retained within said channels of said first panel to permit telescoping movement of said second panel with respect to said first panel, said second panel generally coinciding with said first panel in a stored position and extending beyond one end of said first panel when in a use position so as to form an extension off of said first panel and away from said visor body;

first stop means for limiting movement of said first panel relative to said visor body;

second stop means for limiting movement of said second panel relative to said first panel; and retaining means having a cover engaging said visor body and mounted over said recess to retain said first and second panels between said cover and said visor body.

14. A sun visor assembly as set forth in claim 13 wherein said first stop means includes an interference engagement between a portion of said first panel and said cover.

15. A sun visor assembly as set forth in claim 13 wherein said second stop means includes an interference engagement between a portion of said second panel and said first panel.

16. A sun visor assembly as set forth in claim 13 wherein said visor body is formed of rigid foam.

17. A sun visor assembly as set forth in claim 13 wherein said first panel includes a pair of longitudinally extending legs at one end defining an open area therebetween.

18. A sun visor assembly as set forth in claim 17 further comprises a vanity assembly mounted to said visor body, said vanity located on said body so as to be received within said open area of said first panel.

19. A sun visor assembly for use in a motor vehicle, said assembly comprising:

a visor body having a pair of opposing longitudinal sides and a pair of opposing lateral ends;

a first panel movably mounted to said visor body and adapted for lateral movement between a stored position and a use position, said first panel generally coinciding with said visor body when in said stored position and generally extending beyond one of said lateral ends of said visor body when in said use position, said first panel including a pair of opposing sides and a first and second opposing end, each of said sides including a returnly bent portion terminating in oppositely facing edges, said returnly bent portions defining channels being open in a direction toward one another;

a second panel being movably mounted to said first panel in said channels and adapted for telescoping movement relative to said first panel between a retracted position and an extended position, said second panel generally coinciding with said first panel in said retracted position and generally extending axially beyond said first end of said first panel when in said extended position; and means for retaining said first and second panels to said visor body.

20. A sun visor assembly as set forth in claim 19 further comprising first stop means for limiting movement of said first and second panels with respect to said visor body.

* * * * *